United States Patent Office 3,327,027
Patented June 20, 1967

3,327,027
PROCESS FOR THE PRODUCTION OF PLUTONIUM OXIDE-CONTAINING NUCLEAR FUEL POWDERS
Philippe D. S. St. Pierre, Schenectady, N.Y., assignor to General Electric Company, a corporation of New York
No Drawing. Original application Oct. 28, 1960, Ser. No. 65,610, now Patent No. 3,168,601, dated Feb. 2, 1965. Divided and this application Aug. 7, 1964, Ser. No. 388,286
6 Claims. (Cl. 264—.5)

This application is a division of my copending application Ser. No. 65,610, filed Oct. 28, 1960, and now Patent No. 3,168,601.

The present invention relates to a process for making material useful as a fuel element in nuclear reactors generally and more in particular to power reactors of a solid fuel type.

Heretofore, reactors have usually had metallic fuel elements. Certain disadvantages are inherent in fuel elements of this type and oxide fuel elements have long been sought to replace the metallic elements.

In the preparation of oxide nuclear fuels composed of plutonium oxide, plutonium oxide-thorium oxide or plutonium oxide-uranium oxide, it has been known that a satisfactory method of preparing this material is the decomposition of a metal compound to give a metal oxide. Unfortunately, however, the most easily sintered powders are so fine that they are pyrophoric. This makes handling and processing most difficult. This material has heretofore been calcined and then formed into pellets, either alone or mixed with other active oxides.

It is an object of the present invention to produce fuels of plutonium oxide or plutonium oxide combined with thorium oxide and/or uranium oxide which are of maximum density.

It is an additional object of this invention to provide a process for producing high density metal oxide powder of the type described which is suitable for use in nuclear fuel elements.

A still further object of this invention is to produce a plutonium oxide, plutonium oxide-thorium oxide or plutonium oxide-uranium oxide fuel element having a maximum density and a maximum structural stability.

These and other objects will be apparent to one skilled in the art from the following specification, which is limited only by the claims appended thereto.

Compounds of plutonium, either alone or combined with compounds of uranium and/or thorium can be processed to form oxide pellets at least 95 percent dense. Generally, compounds such as the sulfates, nitrates, oxalates, carbonates, or hydroxides of the metals can be used since they can be thermally decomposed at compartively low temperatures in a selected atmosphere. The oxalates, carbonates and hydroxides are usually the most desirable, although the particular compound used is a matter of personal choice. This list is not intended as limiting but merely to illustrate some compounds which can be used. The pellets have high structural strength, which produces a fuel element for atomic reactors that has all of the desired properties of an oxide element, and thereby avoids the difficulties encountered with metallic elements. The compounds should have a particle size greater than 0.1 micron, and it has been found that a particle size of 0.1 to 0.5 micron has produced acceptable pellets having 95 percent density and that 0.5 micron particles give a higher density pellet with less chance of cracking.

Briefly, the process comprises compacting a thermally decomposable compound of plutonium, either alone or with thermally decomposable compounds of thorium and uranium into a green compact, heating this to a decomposition temperature and then continuing heating to a sintering temperature.

COMPACTING

Compacting a selected compound or mixture of compounds under a pressure of not less than about ½ ton per square inch will give a compact of sufficient green strength to allow firing without the compact breaking from internal stress, provided the rate at which the green ware is heated to the decomposition temperature is properly controlled.

Varying amounts of water may be added to assist the compaction process, the amount of water added depending somewhat upon the manner in which compaction is effected. In ordinary pressing, for example, as between opposed dies, amounts of water from 0 to 10 percent, while compacting processes such as extrusion may require as much as 25 to 50 weight percent water.

DECOMPOSING

Decomposition of the compound(s) takes place during heating starting at room temperature and is completed by 700° C. and the compact must be heated to this temperature. The rate of heating is critical and depends on the initial compacting pressure. If the original compacting pressure is ½ ton per square inch, then the green compact may be raised to the temperature range in which decomposition takes place at a much faster rate than can a similar compact which has been pressed at 10 tons per square inch. The compact that has been prepared at ½ ton pressure per square inch may be heated as fast as about 100° C. per hour up to 700° C. to effect decomposition of the diuranate. A compact pressed at 5 tons per square inch, however, should be raised to 700° C. in increments of 25° C. per hour. During the decomposition phase, that is, during the heating of the compacts to 700° C., the atmosphere within the furnace is preferably wet hydrogen, which provides additional moisture, insuring that the process will operate as desired. After the compact has been brought to 700° C. and maintained at this temperature for a sufficient time to complete decomposition, the temperature is raised to the sintering temperature.

When it is desired to produce oxide particles of at least 95 percent density rather than integral compacts, the compound(s) is/are compacted at higher pressures, for example, 5 to 10 tons per square inch or greater, and heated to about 700° C. at rates in excess of those at which physical integrity of the compact can be maintained. Generally, a compact produced by pressing at about 10 tons per square inch will break into cubes 1/16 inch to 1/8 inch in size when heated at a rate of at least 100° C. per hour. The heating rate can be varied somewhat, depending upon the amount of compacting pressure used, the higher pressure permitting slower heating rates and lower pressures requiring faster heating rates. Having fragmented the compact by rapid heating through the decomposition range, densification of the individual particles is achieved by heating them to temperatures on the order of the sintering previously mentioned for integral compacts. Since each particle of the material produced by this means is at least 95 percent dense, the material can be used to form long lengths of fuel elements by procedures such as swaging or into more intricates shapes by slip casting. For example, a suitable container can be filled with particulate metal oxide and then swaged down, drawn or extruded to compact the oxide and reduce the cross-sectional area of the composite while increasing the length thereof.

SINTERING

The compact is raised to sintering temperature after decomposition. The rate of increasing the temperature is not critical and is commonly 50 to 250° C. per hour. The final sintering temperature is an inverse factor of the initial compacting pressure. That is, the higher the initial compacting pressure, the lower the final sintering temperature to attain maximum density may be.

A compact produced by pressing at ½ ton per square inch, heated to 700° C. as described above, which temperature was achieved at a rate of 100° C. per hour in wet hydrogen, must then be raised to a sintering temperature of about 1700° C., where it is held in a wet hydrogen atmosphere for about one hour, and then cooled in dry hydrogen at the furnace cooling rate. This gives a compact of at least 95 percent density. This maximum sintering temperature is critical and a compact prepared under a pressure of ½ ton per square inch, heated to only 1500° C., does not achieve the necessary density, regardless of the length of time it is held at this temperature, and 1700° C. as shown above is necessary.

*Example 1*

Plutonium hydroxide of a particle size between 0.1 and and 0.5 micron with 10 percent water is compacted under a pressure of ½ ton per square inch and then placed in a furnace. The furnace is maintained under an atmosphere of wet hydrogen, which is obtained by bubbling hydrogen through water at room temperature (approximately 20° C.). Hydrogen having a dew point of 0.0° C. would also be acceptable, but hydrogen of a somewhat higher dew point is preferred to insure reproductivity of results. The furnace is then heated at a rate of 100° C. per hour up to 700° C. to effect decomposition of the hydroxide. After decomposition, the compact is sintered by raising the temperate at about 100° C. per hour to 1700° C., maintaining an atmosphere of wet hydrogen, and held at this temperature for about one hour. Then dry hydrogen is introduced into the furnace and the furnace is allowed to cool. This compact will have a density of at least 95 percent.

*Example 2*

Plutonium hydroxide containing 10 percent water is compacted under a pressure of 5 tons per square inch and is placed in a furnace under an atmosphere of wet hydrogen, as in Example 1, and the temperature is raised 25° C. per hour up to 700° C. to decompose the hydroxide. After decomposition, the compact is sintered by raising the temperature at approximately 100° C. per hour to 1500° C. and held for 8 hours in an atmosphere of wet hydrogen. The furnace is then allowed to cool at the rate of 200° C. to 300° C. per hour in an atmosphere of dry hydrogen. This compact will also have a 95 percent density.

*Example 3*

A mixture of 80 percent plutonium hydroxide and 20 percent thorium hydroxide containing 10 percent water is prepared of material having the required particle size and compacted under a pressure of 5 tons per square inch can be processed in the same manner as the material of Example 2 and obtain a compact of at least 95 percent density. Similarly, mixtures of compounds of plutonium and uranium can be prepared which will have the required density and strength.

When a sintering temperature of 1500° C. is used, the compact should be held at this temperature for about 4 to 8 hours, but when a higher sintering temperature is used, the compact may be sintered for much shorter times. Sintering temperatures approaching 2000° C. might require only a few minutes, while temperatures in the range of 1700 to 1800° C. probably require about one hour.

The sintering time or temperature may be materially reduced if the compact is pressed at a higher pressure and processed in the manner described.

While the above examples compacting under pressure is required, the present invention also contemplates that the material need not be pressed in a die but could be consolidated or agglomerated into desired form by slip casting or extrusion, or in the case of powdered material by swaging.

The oxides so formed are heated at a rate not less than 100° C. per hour up to 700° C., where the decomposition has been completed. It is then heated to a sintering temperature of 1500° C. to 1700° C. in the presence of wet hydrogen. After the sintering temperature has been reached, dry hydrogen is introduced and the furnace allowed to cool.

The above process produces a compact consisting of oxides of plutonium or oxides of plutonium combined with oxides of thorium and/or oxides of uranium without additional oxygen that has at least 95 percent of a maximum theoretical density and is therefore useful as a fuel element.

The use of dry hydrogen after sintering is essential to obtain a compact devoid of additional oxygen which would render it subject to radiation damage.

While the best forms of the preferred embodiments of the invention have been described as required by law, it will be apparent to those skilled in the art that it may be applied to other systems of producing fuel elements, and changes may be made in the form to suit special conditions within the scope of this invention as set forth in the appended claims.

What I claim as new and desire to secure by Letters Patent of the United States is:

1. A process for producing particles at least 95 percent dense for use as an oxide nuclear fuel composed of a metal oxide selected from the group consisting of plutonium oxide, thorium oxide-plutonium oxide mixtures, plutonium oxide-uranium oxide mixtures and plutonium oxide-uranium oxide-thorium oxide mixtures, said process comprising compacting a thermally decomposable compound of the metal to be used in the oxide fuel element under a pressure in the range of between about ½ to about 10 tons per square inch to form a green compact, heating the green compact in a hydrogen atmosphere and to a temperature reducing the metal compound, performing the heating to about 700° C. at a rate in excess of a rate in the range of from about 25° C. and about 100° C. per hour and bearing an inverse relation to the compacting pressure thereby causing the green compact to fragmentize due to internally induced stresses, and ultimately heating the material to a sintering temperature of about 1500° C.

2. The process defined in claim 1 wherein the plutonium compound is selected from the group consisting of plutonium oxalate, plutonium carbonate and plutonium hydroxide.

3. The process defined in claim 2 wherein the plutonium compound is plutonium oxalate.

4. The process defined in claim 1 wherein said compact consists of a mixture of a compound of plutonium combined with a compound of thorium, the compounds being selected from the group consisting of oxalates, carbonates and hydroxides of plutonium and thorium.

5. The process defined in claim 1 wherein said compact consists of a mixture of plutonium and uranium, the plutonium compound being selected from the group consisting of the oxalates, carbonates, and hydroxides, and the uranium compound is a diuranate.

6. A process for producing particles at least 95 percent dense for use as an oxide nuclear fuel composed of a metal oxide selected from the group consisting of plutonium oxide, thorium oxide-plutonium oxide mixtures, plutonium oxide-uranium oxide mixtures and plutonium oxide-uranium oxide-thorium oxide mixtures, said process comprising compacting the metal compound at a pressure of not less than about 10 tons per square inch to form a green compact, heating the green compact in a hydrogen atmosphere and to a temperature reducing the metal compound, performing the heating of the compact to a temperature of about 700° C. at a rate of not less than about 100° C. per hour, and ultimately heating the material to a sintering temperature of about 1500° C.

References Cited

UNITED STATES PATENTS

| | | | |
|---|---|---|---|
| 2,868,620 | 1/1959 | Garner | 23—14.5 |
| 2,868,707 | 1/1959 | Alter et al. | 23—14.5 X |
| 3,114,689 | 12/1963 | Cope et al. | 252—301.1 X |
| 3,141,782 | 7/1964 | Livey et al. | 252—301.1 X |
| 3,168,479 | 2/1965 | St. Pierre | 252—301.1 |

OTHER REFERENCES

A.E.C. Document, KAPL–1837, "Sintering Studies of $PuO_2$—$UO_2$," July 15, 1957, pp. 1–5.

Nuclear Science Abstracts, vol. 13, No. 22, November 1959, Abstract No. 20153.

CARL D. QUARFORTH, *Primary Examiner.*

M. J. SCOLNICK, *Assistant Examiner.*